(12) United States Patent
Hintz et al.

(10) Patent No.: US 8,745,401 B1
(45) Date of Patent: Jun. 3, 2014

(54) AUTHORIZING ACTIONS PERFORMED BY AN ONLINE SERVICE PROVIDER

(75) Inventors: Andrew Hintz, Sunnyvale, CA (US); Michael Wiacek, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 12/945,571

(22) Filed: Nov. 12, 2010

(51) Int. Cl.
 *H04L 9/32* (2006.01)
(52) U.S. Cl.
 USPC ........... 713/176; 713/158; 713/172; 713/178; 713/179; 726/4; 726/29
(58) Field of Classification Search
 USPC .......................................................... 713/176
 See application file for complete search history.

(56) References Cited

U.S. PATENT DOCUMENTS

| | | | |
|---|---|---|---|
| 2003/0046541 A1* | 3/2003 | Gerdes et al. ................. | 713/168 |
| 2006/0206709 A1* | 9/2006 | Labrou et al. ................. | 713/167 |
| 2008/0268815 A1* | 10/2008 | Jazra et al. ..................... | 455/411 |
| 2009/0119754 A1* | 5/2009 | Schubert ........................... | 726/4 |
| 2009/0287921 A1* | 11/2009 | Zhu et al. ...................... | 713/155 |
| 2010/0049975 A1* | 2/2010 | Parno et al. .................... | 713/168 |
| 2010/0100945 A1* | 4/2010 | Ozzie et al. ....................... | 726/5 |
| 2010/0262834 A1* | 10/2010 | Freeman et al. .............. | 713/184 |
| 2011/0026716 A1* | 2/2011 | Tang et al. ..................... | 380/284 |
| 2011/0092185 A1* | 4/2011 | Garskof ........................ | 455/411 |

FOREIGN PATENT DOCUMENTS

EP 1969880 B1 * 5/2012

OTHER PUBLICATIONS

"Pietro et al" "A Two-Factor Mobile Authentication Scheme for Secure Financial Transactions" 2005. Proceedings of the International Conference on Mobile Business (ICMB'05). IEEE.*

* cited by examiner

*Primary Examiner* — Joon H Hwang
*Assistant Examiner* — Johnny Aguiar
(74) *Attorney, Agent, or Firm* — Fish & Richardson P.C.

(57) ABSTRACT

Methods, systems, and apparatus, including computer programs encoded on a computer storage medium, for authorizing actions of a service provider. In one aspect, a method includes providing a user security key to a mobile device of a user. A request is received from a client device distinct from the mobile device to perform an action. A challenge token including a security signature matched to a service security key is generated, and the challenge token is provided to the mobile device. An approval value is received from the client device. The approval value is determined to be valid in reference to the challenge token and the user security key previously provided to the mobile device and to indicate approval to perform the action for the user. The action is performed in response to receiving the approval value.

29 Claims, 6 Drawing Sheets

AUTHORIZING ACTIONS PERFORMED BY AN ONLINE SERVICE PROVIDER

BACKGROUND

This specification relates to authorizing actions to be performed by an online service provider.

Online service providers provide various types of services, for example, email hosting, social networking, and shopping. Many online service providers require users to authenticate themselves to a server by providing a username and a password before the server provides services. The level of security provided by requiring a username and password can be adequate for certain lower-risk or routine actions; however, for some higher-risk actions, online service providers require a greater level of security. For example, for an email provider, actions such as routine checking and sending email can be protected by requiring a username and password, and actions such as establishing a forwarding filter that will block or send large amounts of mail can be protected by another security mechanism.

One way to provide a greater level of security is to require the user to provide a one-time password. A one-time password is a password that authorizes only a single session, series of actions, or period of time. A one-time password provides a greater level of security because, even if the one-time password is intercepted, the one-time password cannot be used again, e.g., in a replay attack.

SUMMARY

A user can authorize actions to be performed by an online service provider using a mobile device. The user, using a client device, sends an authorization request to an authorization server. The authorization server sends a challenge token to the client device. The client device presents the challenge token to the mobile device, e.g., by displaying a visual representation of the challenge token on a display device. The mobile device receives the challenge token, e.g., when the user takes a picture of the challenge token using the mobile device's camera. The mobile device authenticates the token using a security key and then asks the user whether the user wants to authorize the actions. If the user authorizes the actions, then the mobile device generates an approval code. If the mobile device can communicate with the authorization server, the mobile device can send the approval code to the authorization server. Alternatively, the mobile device can display the approval code on its display, and the user can send the approval code the authorization server using the client device. When the authorization server receives the approval code, the authorization server performs the requested actions.

In general, one innovative aspect of the subject matter described in this specification can be embodied in methods that include the actions of providing a user security key to a mobile device of a user; receiving from a client device distinct from the mobile device a request from the user to perform an action; generating a challenge token including a security signature matched to a service security key and providing the challenge token to the mobile device; receiving an approval value from the client device; determining that the approval value is valid in reference to the challenge token and the user security key previously provided to the mobile device and indicates approval to perform the action for the user; and performing the action in response to receiving the approval value. Other embodiments of this aspect include corresponding systems, apparatus, and computer programs, configured to perform the actions of the methods, encoded on computer storage devices.

These and other embodiments can each optionally include one or more of the following features. The challenge token comprises data representing a time stamp, a description of the action, an account identifier, or an authorization request identifier. Determining that the approval value is valid in reference to the challenge token and the user security key comprises performing a signature verifying algorithm using the approval value. The service security key is a private key, and wherein the user security key is a public key corresponding to the private key. The actions further comprise receiving an account identifier for an account and determining from account security preferences for the account that the action requires authorization using the mobile device. The actions further comprise sending the challenge token to the client device, and wherein the client device is configured to provide the challenge token to the mobile device. The actions further comprise sending instructions to the mobile device that, when executed by the mobile device, configure the mobile device to determine the approval value and send the approval value to the client device. The actions further comprise sending instructions to the mobile device that, when executed by the mobile device, configure the mobile device to perform one of: displaying an image of a visual representation of the approval value; playing an audible representation of the approval value; or sending the approval value to the client device using a wireless communication link. The actions further comprise sending instructions to the mobile device that, when executed by the mobile device, configure the mobile device to prompt the user for an approval indication and receive the approval indication from the user. The actions further comprise providing the mobile device with a plurality of account security keys, each account security key being associated with a distinct user account.

In general, another innovative aspect of the subject matter described in this specification can be embodied in methods performed by a mobile device that include the actions of receiving a user security key from a server; receiving a challenge token from the server, wherein the challenge token includes a security signature matched to a service security key, and wherein the challenge token includes a reference to an action to be performed by the server; determining that the challenge token is valid in reference to the user security key using the security signature; generating an approval value indicating approval to perform the action referred to by the challenge token; and providing the approval value to a client device distinct from the mobile device, wherein the client device is configured to send the approval value to the server. Other embodiments of this aspect include corresponding systems, apparatus, and computer programs, configured to perform the actions of the methods, encoded on computer storage devices.

These and other embodiments can each optionally include one or more of the following features. Providing the approval value to the client device comprises performing one of: displaying an image of a visual representation of the approval value; playing an audible representation of the approval value; and sending the approval value to the client device using a wireless communication link. The actions further comprise prompting a user for an approval indication and receiving the approval indication from the user. The actions further comprise receiving a plurality of account security keys from the server, each user account key being associated with a distinct user account; and selecting the user security key from the account security keys.

Particular embodiments of the subject matter described in this specification can be implemented so as to realize one or more of the following advantages. A temporary password can be used to authorize the actions without requiring a shared state (e.g., using a counter, or a synchronized timer) between the service provider and a client device. A multipurpose mobile device can be used to authorize the actions instead of a dedicated device that provides temporary passwords. The mobile device can be used even though the mobile device is not in communication with a service provider, e.g., even though the mobile device has lost a connection with a cellular network or a WiFi network.

Actions of an online service provider can be authorized based on the scope of the actions. A user can be prompted with an informational dialog expressly setting forth the actions being authorized, which provides extra protection against malicious requests for the one time password (e.g., phishing attacks or man-in-the-middle attacks) because the user is made aware of the scope of the actions being authorized.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
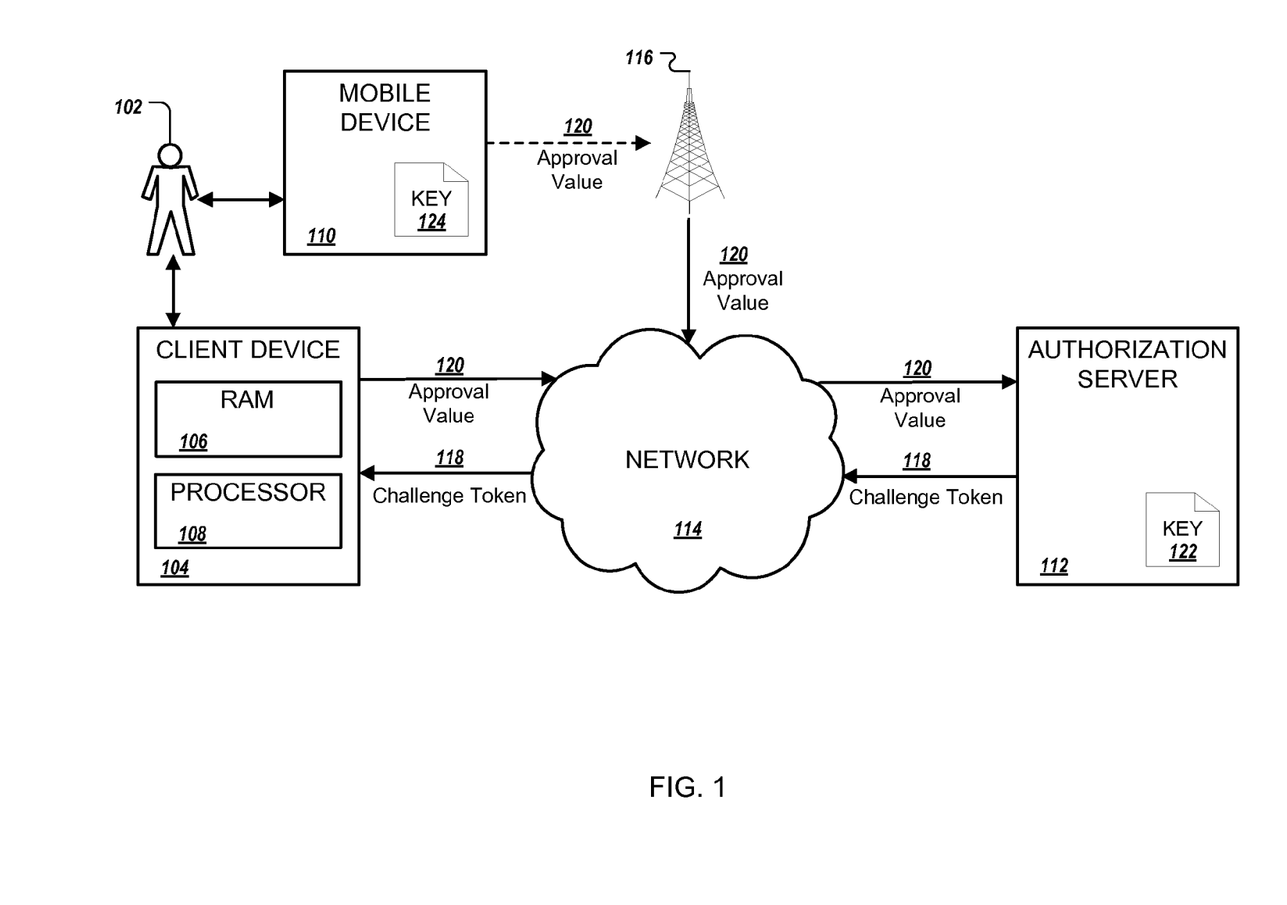
FIG. 1 is a block diagram showing an authorization server for authorizing actions of a service provider by communicating with a client device and a mobile device.

FIG. 1 is a block diagram showing an authorization server 112 for authorizing actions of a service provider by communicating with a client device 104 and a mobile device 110.

The authorization server 112 provides one or more online services, for example, email hosting, social networking, and shopping. A user 102 accesses the services using a client device 104 that communicates with the authorization server 112 over a network 114. The client device can be, for example, a personal computer having random access memory (RAM) 106 and one or more processors 108. In some implementations, the client device is another mobile device distinct from the illustrated mobile device 110. A mobile device is, for example, a handheld telephone device, a smart phone, a laptop computer, or a portable touch screen computer.

In general, the authorization server 112 requires the user 102 to authenticate by providing a username and password before the server provides services or access to personal data stored by the server in connection with the services. For one or more actions that have been classified as high risk actions, the authorization server 112 requires the user 102 to authenticate using a method different from providing a conventional username and password. An action that may be classified as high risk action includes an action that, for example, provides or requires access to particularly sensitive data, or changes a user account preference that does not frequently change. An example of a high risk action is creating a forwarding filter in a web based email service. Creating a forwarding filter is high risk because it potentially causes large amounts of important email to be forwarded.

In some implementations, the user 102 uses the client device 104 to request authorization of one or more actions from the authorization server 112, and the authorization server 112 provides a challenge token 118 to the client device 104. The challenge token 118 includes a security signature matched to a security key 122.

The client device 104 displays a visual representation of the challenge token 118 on a display. The user 102 transfers the challenge token 118 to the mobile device 110, e.g., by using a camera of the mobile device 110 to capture an image of the visual representation of the challenge token 118, or by manually entering text characters from the visual representation into the mobile device 110. The mobile device 110 authenticates the challenge token 118 using a key corresponding to the security key 124. Then the mobile device 110 presents an informational dialog that explains to the user 102 the actions being requested. The mobile device 110 presents the user 102 with the option to approve or deny the request. If the user 102 approves the request, the mobile device 110 generates an approval value 120. If the user 102 does not approve the request, or the challenge token 118 fails authentication, then the authorization server 112 denies the request.

The mobile device 110 sends the approval value 120 to the authorization server 112. If the mobile device 110 is able to communicate with the authorization server 112 using a cellular telephone network, for example, the mobile device 110 can send the approval value 120 to the authorization server 112 without using the client device 104. If the mobile device 110 cannot communicate with the authorization server 112, the mobile device 110 presents a visual representation of the approval value to the user 102. The user 102 enters the approval value into the client device 104, and the client device 104 sends the approval value 120 to the authorization server 112 over the network 114. When the authorization server 112 receives the approval value 120, the authorization server 112 performs the requested actions.

Figure 2:
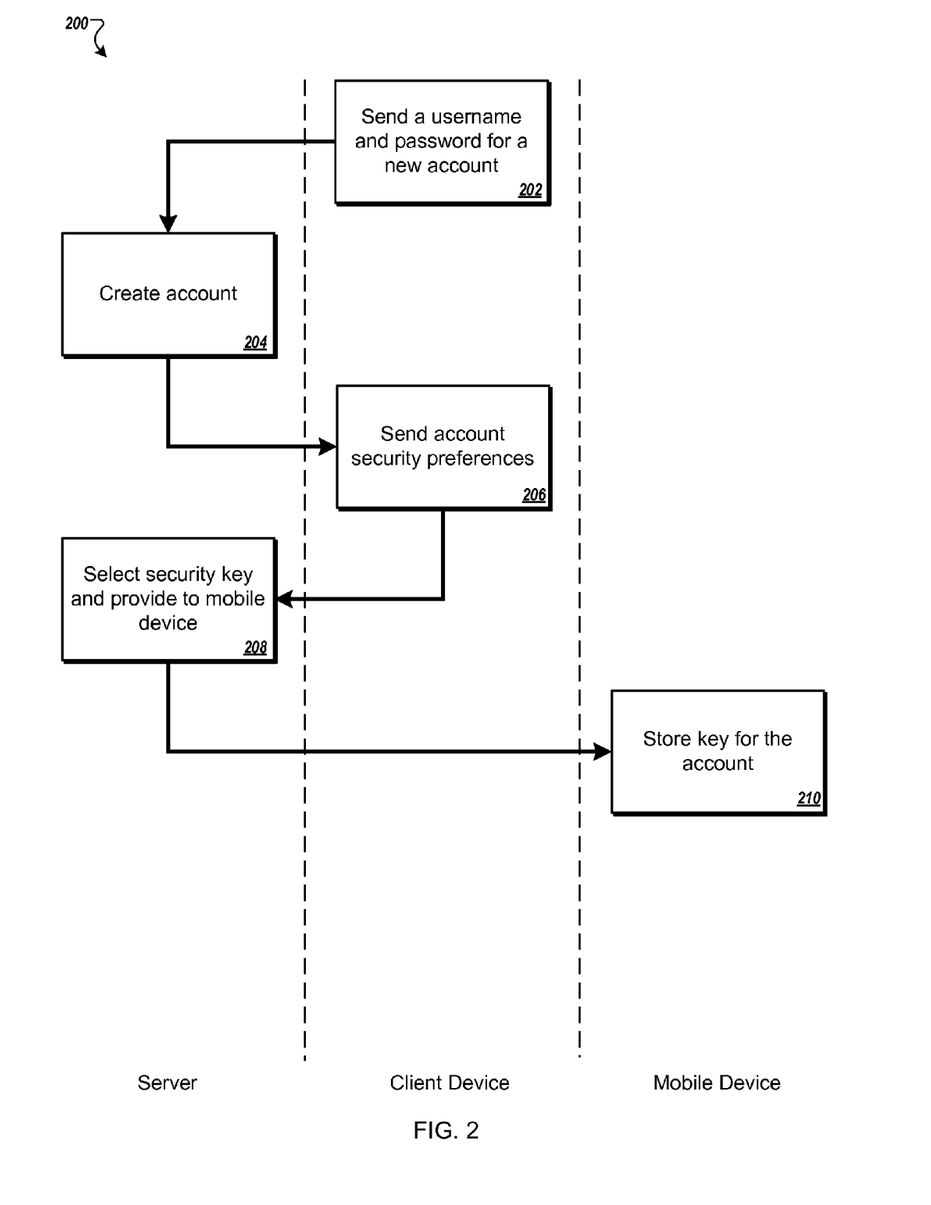
FIG. 2 is a flow diagram of an example process for creating an account so that actions associated with the account can be authorized using a mobile device.

FIG. 2 is a flow diagram of an example process 200 for creating an account so that actions associated with the account can be authorized using a mobile device. Steps of the process 200 are performed by a server, e.g., the authorization server of FIG. 1, a client device, e.g., the client device 104 of FIG. 1, and a mobile device, e.g., the mobile device 110 of FIG. 1. The account is used to access services of an online service provider.

The client device sends a username and a password for the account to the server (step 202). For example, a user uses a web browser running on the client device to load an account creation web page from the server. The user enters a desired username and password in data input fields on the page. In response to a user command, the web browser sends the username and password to the server.

The server creates the account using the username and password (step 204). For example, the server allocates storage space for the account and enters the username and password into a database of account information.

The client device sends account security preferences to the server (step 206). For example, the user loads an account security preferences web page from the server and selects account security preferences from options provided on the web page. Account security preferences specify, among other things, one or more actions in connection with the service provider for which the user desires greater security. The actions are, for example, classified by the user as high risk actions.

The account security preferences specify a mobile device. The mobile device can be specified in various ways, for example, by an associated telephone number. The account security preferences can specify that the mobile device is to be used to authenticate the user when the user requests authorization to perform any of the actions for which the user desires greater security.

The server selects a security key and provides the security key to the mobile device (step 208). The security key is a cryptographic key that can be used to authenticate communication between the server and the mobile device. In some implementations, the server selects a private key that it stores with the account information for the account, and the server selects a corresponding public key that it provides to the mobile device. The server can optionally provide another private key to the mobile device and store a corresponding public key in the account information. In other implementations, the server selects a single private key that is shared between the server and the mobile device.

In some implementations, the server generates the security key. In other implementations, the server receives the security key from a key generation service. Various techniques, e.g., conventional techniques such as Public Key Infrastructure (PKI) techniques, can be used to generate the security key.

In some implementations, the server sends the security key to the mobile device over a network. For example, the security key can be sent to a phone number for the mobile device. In some other implementations, the server sends the security key to the client device which displays a visual representation of the security key, e.g., as a two-dimensional bar code, on a display. The user uses the mobile device's camera to capture an image of the visual representation. In various other implementations, the server sends the security key to the client device, which then provides the security key to the mobile device, e.g., using a physical or a wireless communication link, e.g., a Bluetooth link.

The mobile device stores the security key for the account (step 210). In some implementations, the mobile device stores the security key in a database of security keys that are associated with different accounts.

Although the example process 200 is illustrated as involving both a client device and a mobile device, a user can create an account using only the mobile device. For example, a user can use a web browser on the mobile device to load an account creation page; provide a username, password, and account security preferences; and receive the security key from the server.

Figure 3A:
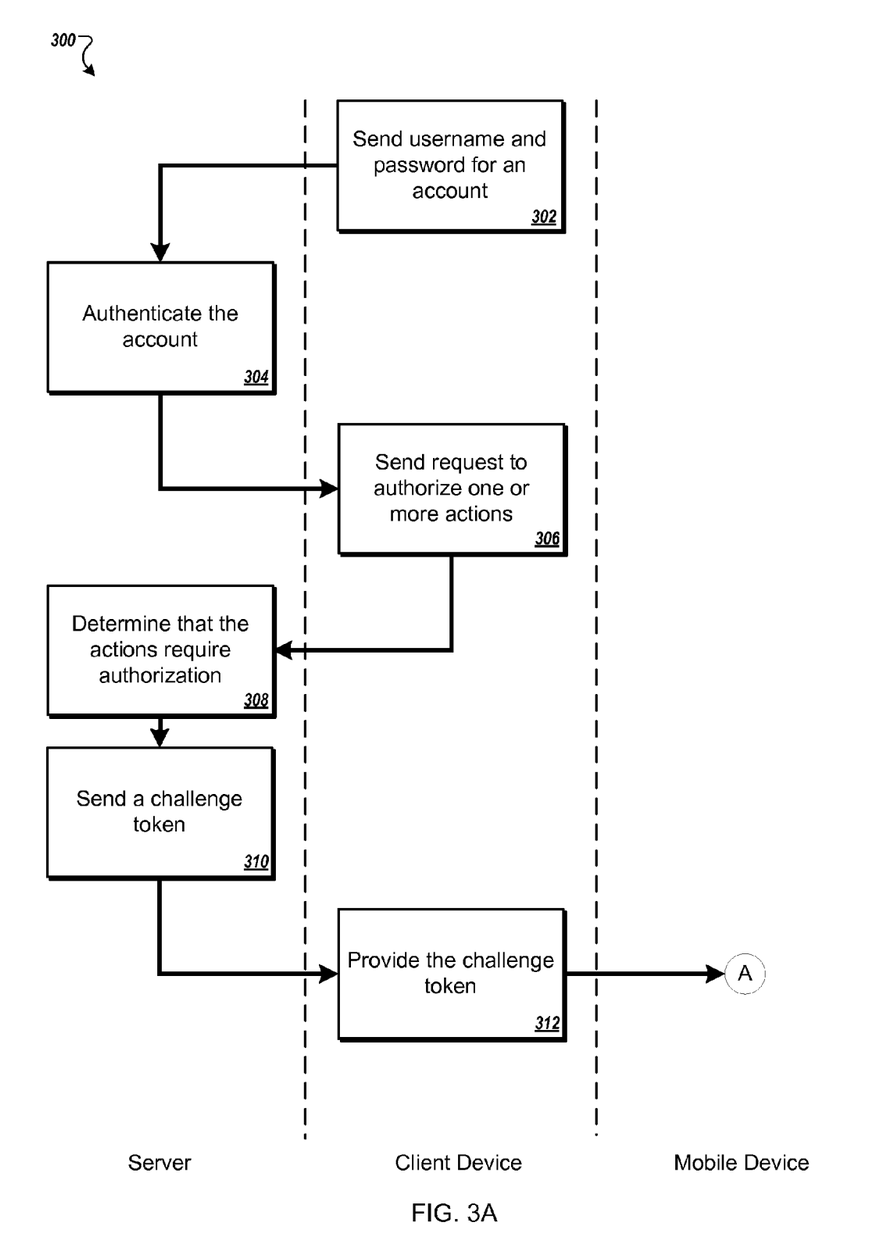
FIGS. 3A and 3B are a flow diagram of an example process for authorizing one or more actions of a service provider.
Figure 3B:
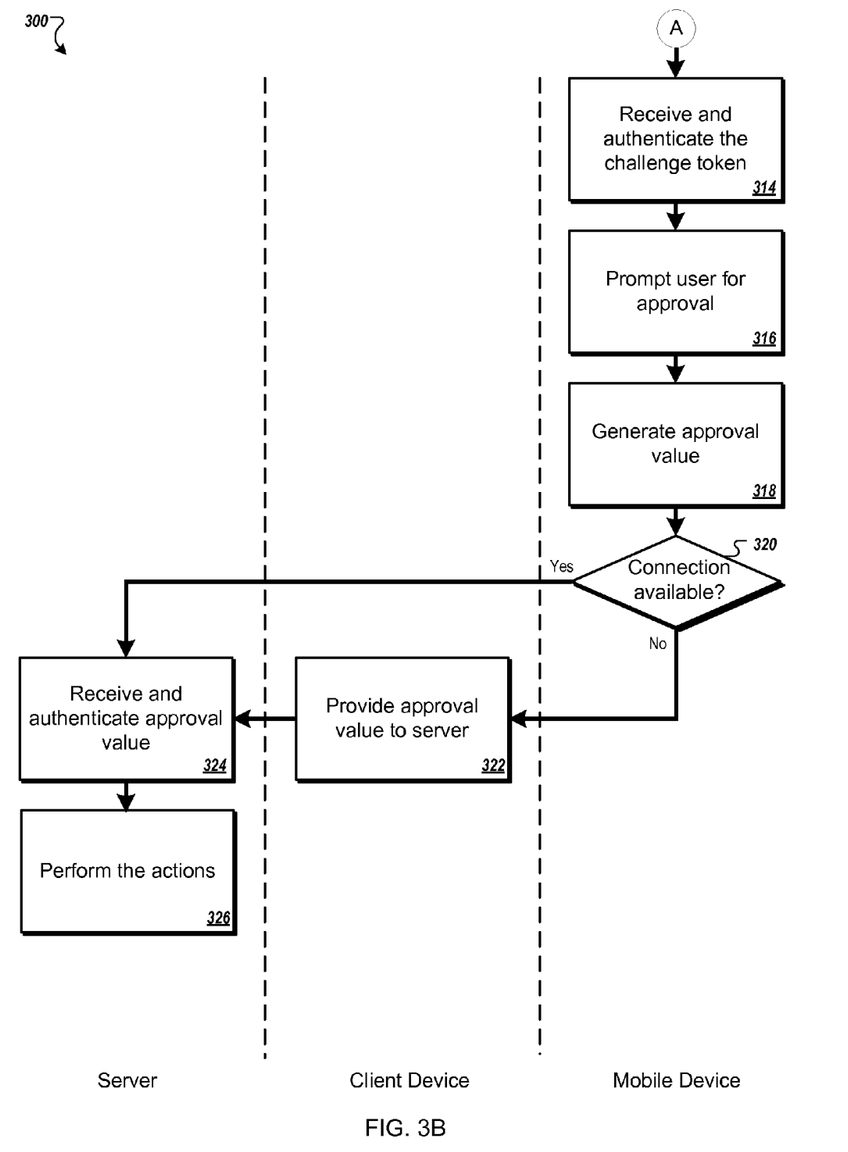

FIGS. 3A and 3B are a flow diagram of an example process 300 for authorizing one or more actions of a service provider. Steps of the process 300 are performed by a server, e.g., the authorization server of FIG. 1, a client device, e.g., the client device 104 of FIG. 1, and a mobile device, e.g., the mobile device 110 of FIG. 1.

The client device sends a username and a password for an account associated with the service provider (step 302). For example, a user uses a web browser running on the client device to load a log-in page for the service and enters the username and password.

The server authenticates the account (step 304). For example, the server uses stored account information for the account associated with the username to compare a stored password to the password provided by the client device. In some cases, the received password will not match the stored password. In those cases, the server can, for example, send an error message to the client device. For purposes of illustration, the process 300 is illustrated with the actions that occur when the passwords match.

The client device sends a request that the service provider perform one or more actions (step 306). For example, a user uses a web browser running on the client device to load a web page presenting optional actions, and the user uses the web browser to select one or more of the actions. If the service provider provides web based email, the actions could be, for example, reading a message, deleting a message, changing a password for a user account, or setting up a forwarding filter. If the service provider provides a social networking service, the actions could be, for example, adding a new person to a user's social network, changing a privacy setting, or changing a user status message.

The server determines that the actions require authorization (step 308). For example, the server determines that account security preferences for the account specify that the actions require authorization using the mobile device. The account security preferences are set by the account owner, e.g., as described above with reference to FIG. 2, or by a security administrator.

The server sends a challenge token to the client device (step 310). A challenge token is a digital item used to authorize the actions. The challenge token includes a security signature based on a security key. The system can generate the security signature using various techniques, e.g., conventional cryptographic signature algorithms such as Hash-based Message Authentication Code (HMAC). In general, the security signature is based on the security key and the content of the challenge token.

In some implementations, the challenge token is encoded as a quick release (QR) code. A QR code is a type of two-dimensional barcode that, when displayed, appears as a pattern of black squares on a white background. Various types of data can be encoded in a QR code.

In some implementations, the challenge token includes data representing one or more of a time stamp (e.g., of the time of the request or the time the challenge token is sent), a description of the one or more actions (e.g., in plain text or as identifiers corresponding to actions), a user identifier (e.g., of a user using the client device to send the request, where the user has already authenticated to the system using a username and password), or an authorization request identifier (e.g., a unique value associated with the request).

The client device provides the challenge token to the mobile device (step 312), either by making it available to be read by the mobile device or by sending it to the mobile device. In some implementations, the client device displays a visual representation of the challenge token on a display so that the mobile device can capture the visual representation using a camera. For example, the visual representation can be a two-dimensional bar code. In some implementations, the client device plays an audio representation of the challenge token so that the mobile device can capture the audio representation using a microphone. In some implementations, the client device sends the challenge token to the mobile device using a wireless communication link, e.g., Bluetooth.

Although the process 300 is illustrated so that the server provides the challenge token to the client device, in some implementations, the server does not provide the challenge token to the client device. Instead, the server sends the challenge token to the mobile device without sending the challenge token to the client device. For example, if the mobile device is in communication with the Internet, the server can send the challenge token to the mobile device over the Internet. Alternatively, if the mobile device is in communication with a cellular telephone network, the server can send a Short Message Service (SMS) message to the mobile device.

The mobile device receives and authenticates the challenge token (step 314), e.g., as has been described above. The mobile device authenticates the challenge token using the security signature of the challenge token and a security key previously stored on the mobile device for the account. In some implementations, authenticating the challenge token is also based on the content of the challenge token. The security key on the mobile device is, for example, a public key corresponding to a private key on the server used to generate the challenge token, or a copy of a secret key stored on both the mobile device and the server.

In some implementations, the mobile device stores multiple security keys for multiple accounts. When the mobile device receives the challenge token, the mobile device determines which account the challenge token is associated with to select the corresponding security key. For example, the mobile device may read a username embedded in the challenge token, or the mobile device may prompt the user to identify the correct account.

The mobile device prompts the user for approval (step 316). In some implementations, the mobile device presents an informational dialog that explains the actions being requested. For example, the mobile device may present text embedded in the challenge token, or the mobile device may present text previously stored on the mobile device that corresponds to action identifiers embedded in the challenge token.

The mobile device presents the user with the option to approve or deny the request. The user approves the request, for example, by clicking a button on the mobile device or speaking an audible command. In some cases, the user will deny the request. In those cases, the mobile device can, for example, send an error message to the server or the client device, or take no further action. The server then denies the request for authorization, for example, when the server receives an error message, or when a threshold amount of time passes without an authorizing input from the user. For purposes of illustration, the process 300 is illustrated with the actions that occur when the user approves the request.

The mobile device generates an approval value (step 318). The approval value indicates approval to perform the actions for the user. In some implementations, the mobile device has a private key for the account and the server has a corresponding public key for the account. The keys are associated with the account. The approval value is generated using the private key. In implementations where the mobile device and the server share a secret key for the account, the mobile device generates the approval value using the shared secret key.

The mobile device determines whether it can communicate with the server without using the client device (step 320). For example, the mobile device determines whether a cellular connection to the Internet is available. If so, the mobile device sends the approval value to the server using the cellular connection. If the mobile device determines that it cannot communicate with the server directly, the mobile device provides the approval value to the client device. For example, the mobile device may display the approval value as text to the user so that the user can enter the approval value into the client device, or the mobile device may send the approval value to the client device using a physical or wireless communication link. In another example, the mobile device may display a visual representation of the approval value, e.g., a 2D bar code, so that the user can use a camera for the client device to capture an image of the visual representation of the approval value. In a further example, the mobile device may play an audible representation of the approval value that the client device captures using a microphone. The client device then provides the approval value to the server (step 322).

The server receives and authenticates the approval value (step 324). The server uses the appropriate key for the account and a signature verifying algorithm to authenticate the approval value, e.g., either a secret key shared with the mobile device or a public key corresponding to a private key on the mobile device. In some implementations, the server determines that the approval value has not expired due to lapse of time before authorizing the actions. To do so, the server can compare the time that the challenge token was sent to the time when the approval value was received, or a time embedded in the approval value. The server performs the actions (step 326).

In some implementations, the actions are only authorized for a limited time. For example, if the service provider is an email provider and the actions are high risk actions such as changing the username or establishing a forwarding filter, the server can authorize the actions for a period of time typically needed for a user to complete those actions, e.g., five or ten minutes. The period of time can be a default value or can be set, for example, by the user or a security administrator. The time can be stored with the account security preferences for the account.

Figure 4:
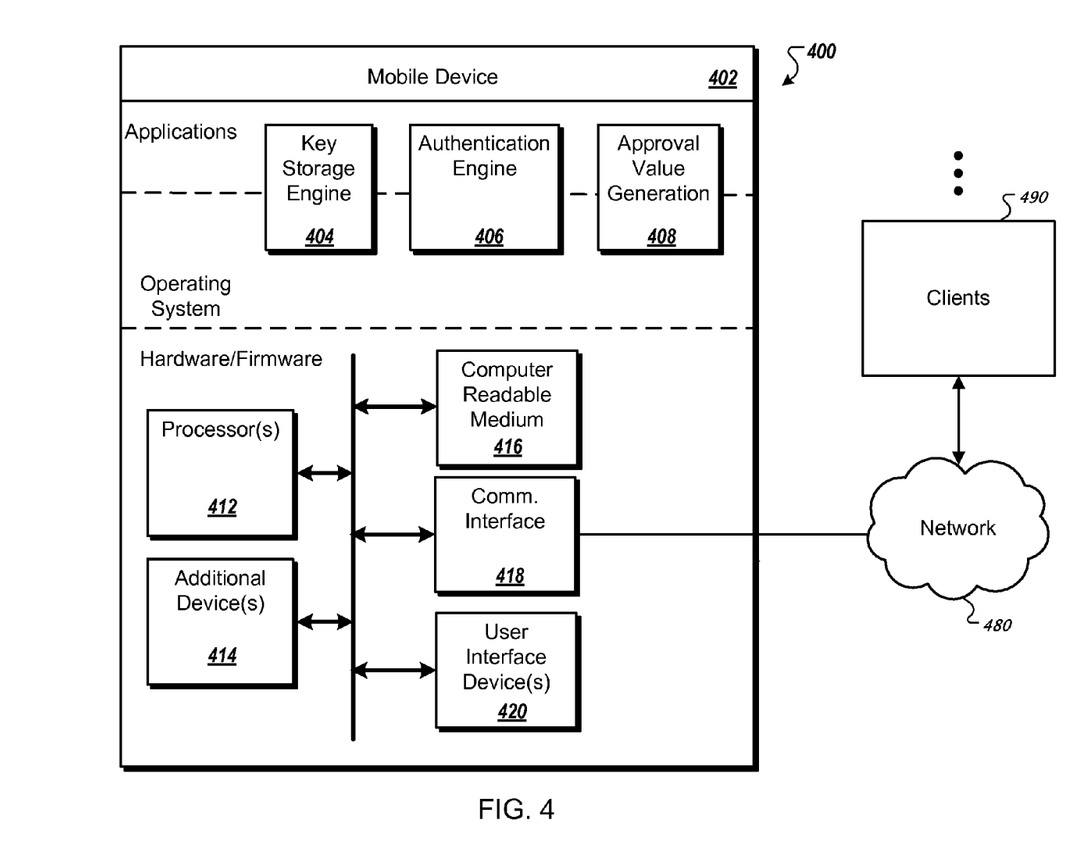
FIG. 4 is a schematic diagram of an example mobile device configured to authorize actions in connection with a service provider.

FIG. 4 is a schematic diagram of an example mobile device 402 configured to authorize actions in connection with a service provider. In operation, the mobile device 402 communicates with one or more client computers 490 or servers, directly or through a network 480. The mobile device 402 includes various modules, e.g., modules of computer program instructions, including a key storage engine 504 for storing keys and associating each key with a user account, an authentication engine 406 for authenticating challenge tokens using the keys stored by the key storage engine 404, and an approval value generation engine 408 for generating approval values using the keys stored by the key storage engine 404.

Each module is configured to run on the mobile device 402. For example, a module can run as part of an operating system on the mobile device 402, as an application on the mobile device 402, or as part of the operating system and part of an application on the mobile device 402. Although several software modules are illustrated, the functionality of the mobile device may be implemented in fewer or more software modules.

The mobile device 402 also includes hardware or firmware devices including one or more processors 412, one or more additional devices 414, a computer readable medium 416, a communication interface 418, and one or more user interface devices 420. Each processor 412 is capable of executing instructions for execution within the mobile device 402. Each processor 412 is capable of executing instructions stored on the computer readable medium 416 or on a storage device such as one of the additional devices 414. The mobile device 402 uses its communication interface 418 to communicate with one or more computers 490, for example, over a network 480. The mobile device 402 can include one or more of a cellular telephone communication interface, a Bluetooth communication interface, or a WiFi interface. Examples of user interface devices 420 include a display, a camera, a speaker, a microphone, a tactile feedback device, a keyboard, a click wheel, or a mouse.

The example mobile device 402 of FIG. 4 is one possible mobile device to perform steps of the processes 200 and 300 illustrated in FIG. 2 and FIGS. 3A and 3B. Other mobile devices are possible. For example, the mobile device may be a single purpose custom device that is used only for authorizing actions.

Figure 5:
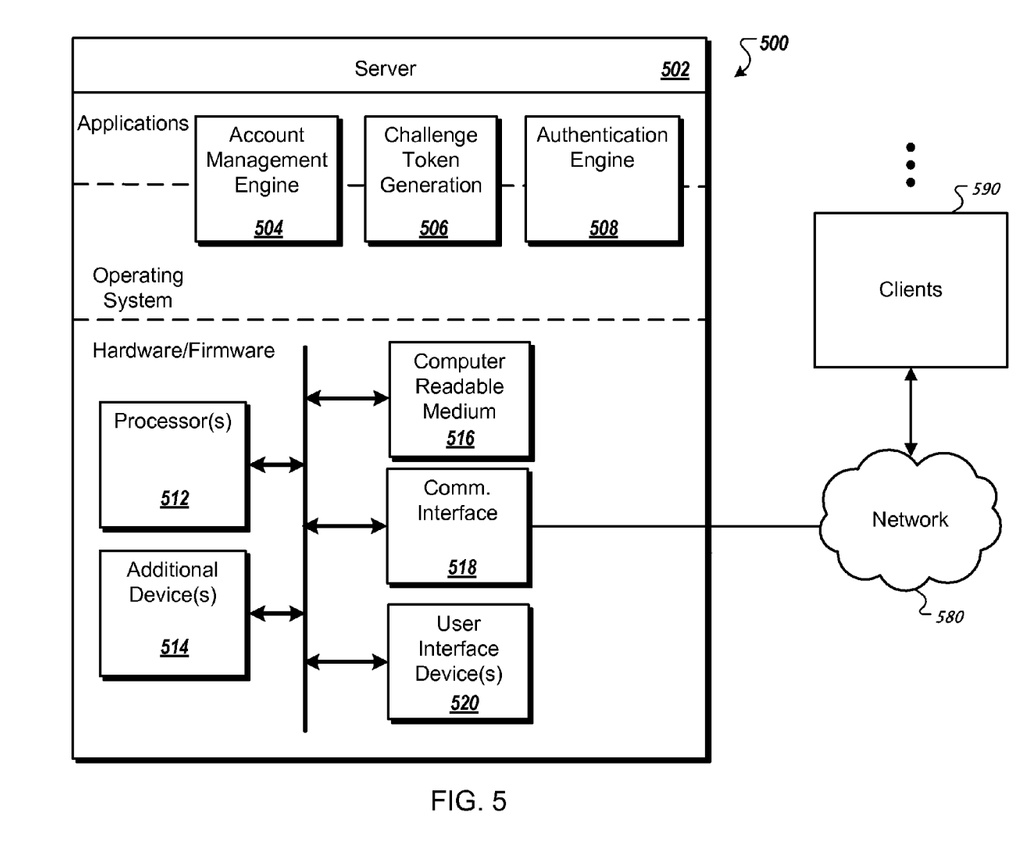
FIG. 5 is a schematic diagram of an example system configured to authorize actions of a service provider.

FIG. 5 is a schematic diagram of an example computing system to authorize actions of a service provider. The system generally includes a server 502. In operation, the server 502 communicates with one or more client devices 590 or mobile devices, directly or through a network 580.

The server 502 includes one or more data processing apparatus. While only one data processing apparatus is shown in FIG. 5, multiple data processing apparatus can be used. The server 502 can be distributed geographically. For example, the server 502 can include multiple data processing apparatus in various geographic locations.

The server 502 includes various modules, e.g., modules of computer program instructions, including an account management engine 504 configured to manage accounts, including for each account, a username, password, and one or more security keys; a challenge token generation engine 506 to generate challenge tokens in response to requests to authorize actions; and an authentication engine 508 to authenticate approval values received in response to providing challenge tokens generated by the challenge token generation engine 506.

Each module is configured to run on the server 502. For example, a module can run as part of an operating system on the server 502, as an application on the server 502, or as part of the operating system and part of an application on the server 502. Although several software modules are illustrated, the functionality of the server may be implemented in fewer or more software modules. Moreover, the software modules can be distributed on one or more data processing apparatus connected by one or more networks or other suitable communication mediums.

The server 502 also includes hardware or firmware devices including one or more processors 512, one or more additional devices 514, a computer readable medium 516, a communication interface 518, and one or more user interface devices 520. Each processor 512 is capable of executing instructions for execution within the server 502. Each processor 512 is capable of executing instructions stored on the computer readable medium 516 or on a storage device such as one of the additional devices 514. The server 502 uses its communication interface 518 to communicate with one or more computers 590, for example, over a network 580. Examples of user interface devices 520 include a display, a camera, a speaker, a microphone, a tactile feedback device, a keyboard, and a mouse. The server 502 can store instructions that implement operations associated with the modules described above, for example, on the computer readable medium 516 or one or more additional devices 514, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An authorization server comprising one or more computers configured to perform operations comprising:
   providing a user security key to a mobile device of a user;
   receiving one or more account security preferences, wherein the account security preferences are selected by the user from one or more options provided by the authorization server, wherein the account security preferences specify one or more first actions, one or more second actions, and the mobile device, and wherein the mobile device is specified to be used, with the user security key, to authorize the one or more first actions, and the mobile device and the user security key are not required to be used to authorize the one or more second actions, wherein the authorization server comprises one or more servers providing one or more services, wherein the one or more first actions and the one or more second actions are to be performed by the authorization server, and wherein the one or more first actions are classified as higher-risk actions requiring a higher level of authorization security and the one or more second actions are classified as lower-risk actions requiring a lower level of authorization security;
   receiving from a client device distinct from the mobile device a request from the user to perform an action; and
   determining, using the account security preferences, the action requires authorization using the mobile device and the user security key, and in response:
   generating a challenge token including a security signature matched to a service security key stored on the one or more computers of the authorization server, wherein the service security key is cryptographically matched to the user security key, and wherein the security signature is generated using the service security key and content of the challenge token;

providing the challenge token to the mobile device;

receiving an approval value from the client device;

determining the approval value is valid in reference to the challenge token and the user security key previously provided to the mobile device and indicates approval to perform the action for the user; and performing the action in response to determining the approval value is valid.

2. The authorization server of claim 1, wherein the challenge token comprises data representing a time stamp, a description of the action, an account identifier, or an authorization request identifier.

3. The authorization server of claim 1, wherein determining that the approval value is valid in reference to the challenge token and the user security key comprises performing a signature verifying algorithm using the approval value, and wherein the operations further comprise comparing a time that the challenge token is sent to a time when the approval value is received or a time embedded in the approval value and determining that the approval value has not expired due to lapse of time before authorizing the action.

4. The authorization server of claim 1, wherein the service security key is a private key, and wherein the user security key is a public key corresponding to the private key.

5. The authorization server of claim 1, wherein the operations further comprise sending the challenge token to the client device, and wherein the client device is configured to provide the challenge token to the mobile device.

6. The authorization server of claim 1, wherein the operations further comprise sending instructions to the mobile device that, when executed by the mobile device, configure the mobile device to determine the approval value and send the approval value to the client device.

7. The authorization server of claim 1, wherein the operations further comprise sending instructions to the mobile device that, when executed by the mobile device, configure the mobile device to perform one of:

displaying an image of a visual representation of the approval value;

playing an audible representation of the approval value; or sending the approval value to the client device using a wireless communication link.

8. The authorization server of claim 1, wherein the operations further comprise sending instructions to the mobile device that, when executed by the mobile device, configure the mobile device to prompt the user for an approval indication and receive the approval indication from the user.

9. The authorization server of claim 1, wherein the operations further comprise providing the mobile device with a plurality of account security keys, each account security key being associated with a distinct user account.

10. The authorization server of claim 1, wherein the security signature is generated using Hash-based Message Authentication Code, and wherein the challenge token is encoded as a quick release code.

11. A mobile device comprising one or more computers configured to perform operations comprising:

receiving a user security key from an authorization server comprising one or more computers, wherein the mobile device is specified by one or more account security preferences to be used with the user security key to authorize one or more first actions, wherein the account security preferences are selected by a user of the mobile device from one or more options provided by the authorization server and specify the one or more first actions and the mobile device, wherein the account security preferences specify one or more second actions to be authorized without requirement of the mobile device and the user security key, wherein the authorization server comprises one or more servers providing one or more services, wherein the one or more first actions and the one or more second actions are to be performed by the authorization server, and wherein the one or more first actions are classified as higher-risk actions requiring a higher level of authorization security and the one or more second actions are classified as lower-risk actions requiring a lower level of authorization security;

receiving a challenge token from the authorization server, wherein the challenge token includes a security signature matched to a service security key stored on the one or more computers of the authorization server, wherein the service security key is cryptographically matched to the user security key, wherein the security signature is generated using the service security key and content of the challenge token, and wherein the challenge token includes a reference to an action to be performed by the authorization server;

determining the challenge token is valid in reference to the user security key using the security signature;

generating an approval value indicating approval to perform the action referred to by the challenge token; and providing the approval value to a client device distinct from the mobile device, wherein the client device is configured to send the approval value to the authorization server.

12. The mobile device of claim 11, wherein providing the approval value to the client device comprises performing one of:

displaying an image of a visual representation of the approval value;

playing an audible representation of the approval value; and sending the approval value to the client device using a wireless communication link.

13. The mobile device of claim 11, wherein the operations further comprise prompting a user for an approval indication and receiving the approval indication from the user.

14. The mobile device of claim 11, wherein the operations further comprise receiving a plurality of account security keys from the authorization server, each user account key being associated with a distinct user account; and selecting the user security key from the account security keys.

15. A method performed by one or more computers of an authorization server, the method comprising:

providing a user security key to a mobile device of a user;

receiving one or more account security preferences, wherein the account security preferences are selected by the user from one or more options provided by the authorization server, wherein the account security preferences specify one or more first actions, one or more second actions, and the mobile device, wherein the mobile device is specified to be used, with the user security key, to authorize the one or more first actions, and the mobile device and the user security key are not required to be used to authorize the one or more second actions, wherein the authorization server comprises one or more servers providing one or more services, wherein the one or more first actions and the one or more second actions are to be performed by the authorization server, and wherein the one or more first actions are classified as higher-risk actions requiring a higher level of authorization security and the one or more second actions are classified as lower-risk actions requiring a lower level of authorization security;

receiving from a client device distinct from the mobile device a request from the user to perform an action; and determining, using the account security preferences, the action requires authorization using the mobile device and the user security key, and in response:

generating a challenge token including a security signature matched to a service security key stored on the one or more computers of the authorization server, wherein the service security key is cryptographically matched to the user security key, and wherein the security signature is generated using the service security key and content of the challenge token;

providing the challenge token to the mobile device;

receiving an approval value from the client device;

determining the approval value is valid in reference to the challenge token and the user security key previously provided to the mobile device and indicates approval to perform the action for the user; and performing the action in response to determining the approval value is valid.

16. The method of claim 15, wherein the challenge token comprises data representing a time stamp, a description of the action, an account identifier, or an authorization request identifier.

17. The method of claim 15, wherein determining that the approval value is valid in reference to the challenge token and the user security key comprises performing a signature verifying algorithm using the approval value, and wherein further comprising comparing a time when the challenge token is sent to a time when the approval value is received or a time embedded in the approval value and determining that the approval value has not expired due to lapse of time before authorizing the action.

18. The method of claim 15, wherein the service security key is a private key, and wherein the user security key is a public key corresponding to the private key.

19. The method of claim 15, further comprising sending the challenge token to the client device, and wherein the client device is configured to provide the challenge token to the mobile device.

20. The method of claim 15, further comprising sending instructions to the mobile device that, when executed by the mobile device, configure the mobile device to determine the approval value and send the approval value to the client device.

21. The method of claim 15, further comprising sending instructions to the mobile device that, when executed by the mobile device, configure the mobile device to perform one of:
displaying an image of a visual representation of the approval value;
playing an audible representation of the approval value; or
sending the approval value to the client device using a wireless communication link.

22. The method of claim 15, further comprising sending instructions to the mobile device that, when executed by the mobile device, configure the mobile device to prompt the user for an approval indication and receive the approval indication from the user.

23. The method of claim 15, further comprising providing the mobile device with a plurality of account security keys, each account security key being associated with a distinct user account.

24. A method performed by a mobile device, the method comprising:

receiving a user security key from an authorization server comprising one or more computers, wherein the mobile device is specified by one or more account security preferences to be used with the user security key to authorize one or more first actions, wherein the account security preferences are selected by a user of the mobile device from one or more options provided by the authorization server and specify the one or more first actions and the mobile device, wherein the account security preferences specify one or more second actions to be authorized without requirement of the mobile device and the user security key, wherein the authorization server comprises one or more servers providing one or more services, wherein the one or more first actions and the one or more second actions are to be performed by the authorization server, and wherein the one or more first actions are classified as higher-risk actions requiring a higher level of authorization security and the one or more second actions are classified as lower-risk actions requiring a lower level of authorization security;

receiving a challenge token from the authorization server, wherein the challenge token includes a security signature matched to a service security key stored on the one or more computers of the authorization server, wherein the service security key is cryptographically matched to the user security key, wherein the security signature is generated using the service security key and content of the challenge token, and wherein the challenge token includes a reference to an action to be performed by the authorization server;

determining the challenge token is valid in reference to the user security key using the security signature;

generating an approval value indicating approval to perform the action referred to by the challenge token; and providing the approval value to a client device distinct from the mobile device, wherein the client device is configured to send the approval value to the authorization server.

25. The method of claim 24, wherein providing the approval value to the client device comprises performing one of:
displaying an image of a visual representation of the approval value;
playing an audible representation of the approval value; and
sending the approval value to the client device using a wireless communication link.

26. The method of claim 24, further comprising prompting a user for an approval indication and receiving the approval indication from the user.

27. The method of claim 24, further comprising receiving a plurality of account security keys from the authorization server, each user account key being associated with a distinct user account; and selecting the user security key from the account security keys.

28. A non-transitory computer storage medium encoded with a computer program, the program comprising instructions that when executed by one or more computers of an authorization server cause the computers to perform operations comprising:

providing a user security key to a mobile device of a user;

receiving one or more account security preferences, wherein the account security preferences are selected by the user from one or more options provided by the authorization server, wherein the account security preferences specify one or more first actions, one or more second actions, and the mobile device, wherein the mobile device is specified to be used, with the user security key, to authorize the one or more first actions, and the mobile device and the user security key are not required to be used to authorize the one or more second actions, wherein the authorization server comprises one or more servers providing one or more services, wherein the one or more first actions and the one or more second actions are to be performed by the authorization server, and wherein the one or more first actions are classified as higher-risk actions requiring a higher level of authorization security and the one or more second actions are classified as lower-risk actions requiring a lower level of authorization security;

receiving from a client device distinct from the mobile device a request from the user to perform an action; and determining, using the account security preferences, the action requires authorization using the mobile device and the user security key, and in response:

generating a challenge token including a security signature matched to a service security key stored on the one or more computers of the authorization server, wherein the service security key is cryptographically matched to the user security key, and wherein the security signature is generated using the service security key and content of the challenge token, providing the challenge token to the mobile device;

receiving an approval value from the client device;

determining the approval value is valid in reference to the challenge token and the user security key previously provided to the mobile device and indicates approval to perform the action for the user; and performing the action in response to determining the approval value is valid.

29. A non-transitory computer storage medium encoded with a computer program, the program comprising instructions that when executed by a mobile device cause the mobile device to perform operations comprising:

receiving a user security key from an authorization server comprising one or more computers, wherein the mobile device is specified by one or more account security preferences to be used with the user security key to authorize one or more first actions, wherein the account security preferences are selected by a user of the mobile device from one or more options provided by the authorization server and specify the one or more first actions and the mobile device, and wherein the account security preferences specify one or more second actions to be authorized without requirement of the mobile device and the user security key, wherein the authorization server comprises one or more servers providing one or more services, wherein the one or more first actions and the one or more second actions are to be performed by the authorization server, and wherein the one or more first actions are classified as higher-risk actions requiring a higher level of authorization security and the one or more second actions are classified as lower-risk actions requiring a lower level of authorization security;

receiving a challenge token from the authorization server, wherein the challenge token includes a security signature matched to a service security key stored on the one or more computers of the authorization server, wherein the service security key is cryptographically matched to the user security key, wherein the security signature is generated using the service security key and content of the challenge token, and wherein the challenge token includes a reference to an action to be performed by the authorization server;

determining the challenge token is valid in reference to the user security key using the security signature;

generating an approval value indicating approval to perform the action referred to by the challenge token; and providing the approval value to a client device distinct from the mobile device, wherein the client device is configured to send the approval value to the authorization server.

* * * * *